(12) United States Patent  
Gurak

(10) Patent No.: US 8,289,588 B2
(45) Date of Patent: Oct. 16, 2012

(54) SCANNING SHREDDER METHOD AND APPARATUS

(75) Inventor: David M. Gurak, Webster, NY (US)

(73) Assignee: Xerox Corporation, Norwalk, CT (US)

(*) Notice: Subject to any disclaimer, the term of this patent is extended or adjusted under 35 U.S.C. 154(b) by 953 days.

(21) Appl. No.: 12/102,583

(22) Filed: Apr. 14, 2008

(65) Prior Publication Data

US 2009/0257101 A1 Oct. 15, 2009

(51) Int. Cl.
H04N 1/04 (2006.01)

(52) U.S. Cl. ....... 358/498; 358/1.14; 358/1.15; 358/1.1; 358/474; 358/304

(58) Field of Classification Search ............... 358/498, 358/1.14, 1.15, 1.1, 474, 304
See application file for complete search history.

(56) References Cited

U.S. PATENT DOCUMENTS

| | | | |
|---|---|---|---|
| 4,936,517 A | 6/1990 | Kammerer et al. | 241/101.2 |
| 7,195,185 B2 | 3/2007 | Matlin | 241/36 |
| D556,250 S | 11/2007 | Kent et al. | D18/34.6 |
| 2005/0134927 A1 | 6/2005 | Nomura et al. | 358/3.28 |
| 2006/0274352 A1* | 12/2006 | Nakaguma et al. | 358/1.14 |
| 2006/0285147 A1* | 12/2006 | Wolfman et al. | 358/1.14 |
| 2007/0046994 A1* | 3/2007 | Morales et al. | 358/1.16 |
| 2007/0115496 A1* | 5/2007 | Shiraishi et al. | 358/1.14 |

FOREIGN PATENT DOCUMENTS

JP 2006334531 * 12/2006

* cited by examiner

Primary Examiner — Benny Q Tieu
Assistant Examiner — Martin Mushambo
(74) Attorney, Agent, or Firm — Luis M. Ortiz; Kermit D. Lopez; Tuesday A. Kaasch

(57) ABSTRACT

A method and apparatus for verifying content of partially printed purge sheets of confidential documents just after shredding the purge sheets but before the individual strands become separated and disassociated is disclosed. The purge sheet can be passed through a single nip paper transport to a shredder and then to a scanner in order to verify the content of the purge sheets. The scanned document can also be stored on a DFE (digital front end) disk, which provides visual documentation of, purge sheet destruction and can be utilized for later reconciliation. The individual strands of the purge sheet (s) can be separated and disassociated to a container in order to ensure destruction. A small electronic controller board associated with the scanner provides function control and communications to the DFE.

19 Claims, 4 Drawing Sheets

SCANNING SHREDDER METHOD AND APPARATUS

TECHNICAL FIELD

Embodiments are generally related to data-processing devices and methods. Embodiments also relate in general to the field of computers and similar technologies, and in particular to software utilized in this field. Embodiments also relate to shredding devices for the destruction of confidential information.

BACKGROUND OF THE INVENTION

Production machines encounter issues where some number of printed sheets must be removed from the collated output, such as a partially printed purged sheet in an inline finishing application. Such sheets often include contractual requirements that call for their destruction such as, for example, paychecks or account statements. Such confidential matters must be destroyed so as to make the contents of the documents illegible so that disclosure of the contents of the documents or the like is prevented. A print station, for example, can instruct the operator to remove the appropriate sheets bearing confidential matters of an interrupted job. Such devices, however, cannot ensure the destruction of such documents. Hence, it is essential to provide an apparatus that destroys documents in order to preserve the confidentiality of the information contained in the documents.

Many document management programs have been established to provide systemic procedures for the destruction of partially printed purged sheets. Devices for destroying or shredding documents for security purposes are known as "shredders". These devices are widely used for the destruction of documents containing confidential or sensitive information. Shredders destroy documents by cutting or tearing into narrow strips or small segments in order to ensure that the information contained in the documents is illegible. One problem associated with prior art shredding devices is that they do not have the ability to verify the content of the documents before shredding and to store the record of documents that are destructed for later reconciliation.

Based on the foregoing it is believed that a need exists for a shredder, which integrates with a scanner in order to provide visual documentation of purge sheet destruction. A need also exists for storing the scanned document for later reconciliation.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved shredder method and apparatus.

It is another aspect of the present invention to provide a method and apparatus for the visual documentation of purge sheet destruction.

It is a further aspect of the present invention to provide for scanned job storage in a memory, such as a digital front-end disk, for later reconciliation.

The aforementioned aspects and other objectives and advantages can now be achieved as described herein. A method and apparatus for verifying the content of partially printed purge sheets of confidential documents immediately after shredding the purge sheets, but before the individual strands become separated and disassociated, is disclosed herein. The purge sheet can be passed through a single nip paper transport to a shredder and then to a scanner in order to verify the content of the purge sheets. The scanned document can also be stored on a DFE (digital front end) disk, which provides visual documentation of purge sheet destruction and can be utilized for later reconciliation. The individual strands of the purge sheet(s) can be separated and disassociated to a container in order to ensure destruction. A small electronic controller board associated with the scanner provides function control and communications to the DFE.

Varying levels of integration are possible, such as scanned job storage on the DFE disk for later reconciliation or operating in a near-line capacity and accept job programming from the DFE. The workflow for the operation of the intelligent shredder can necessarily follow the implemented level of integration.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
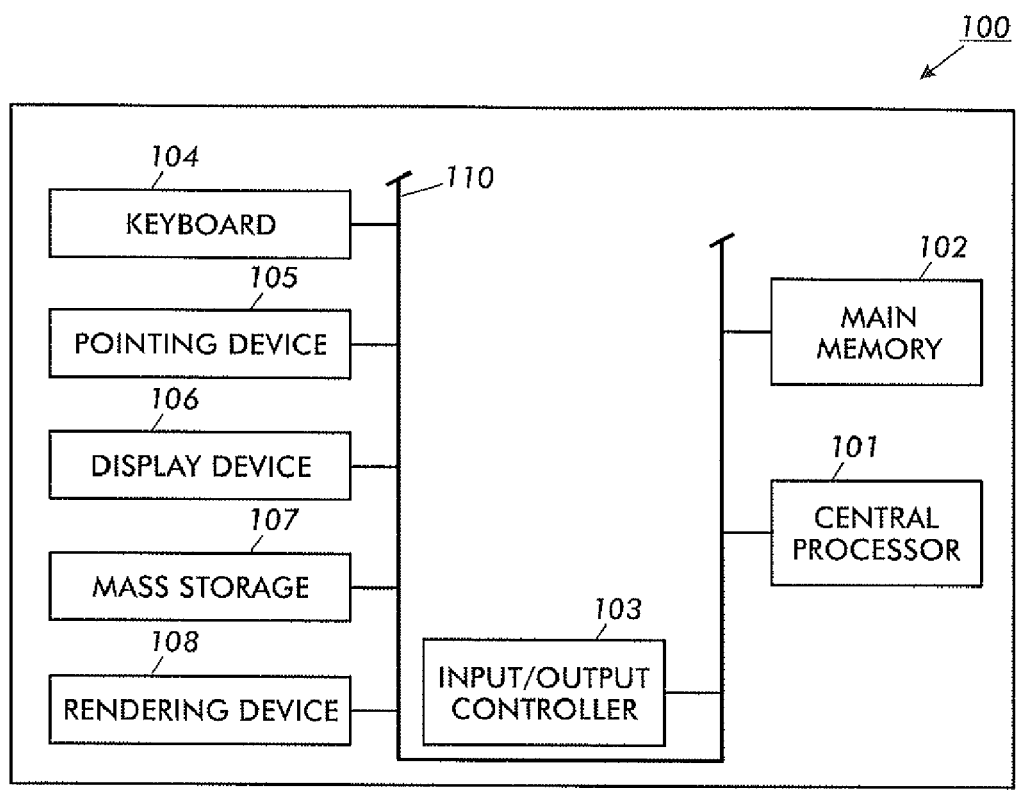
FIG. 1 illustrates a schematic view of a data-processing apparatus in which the present invention may be embodied.
Figure 2:
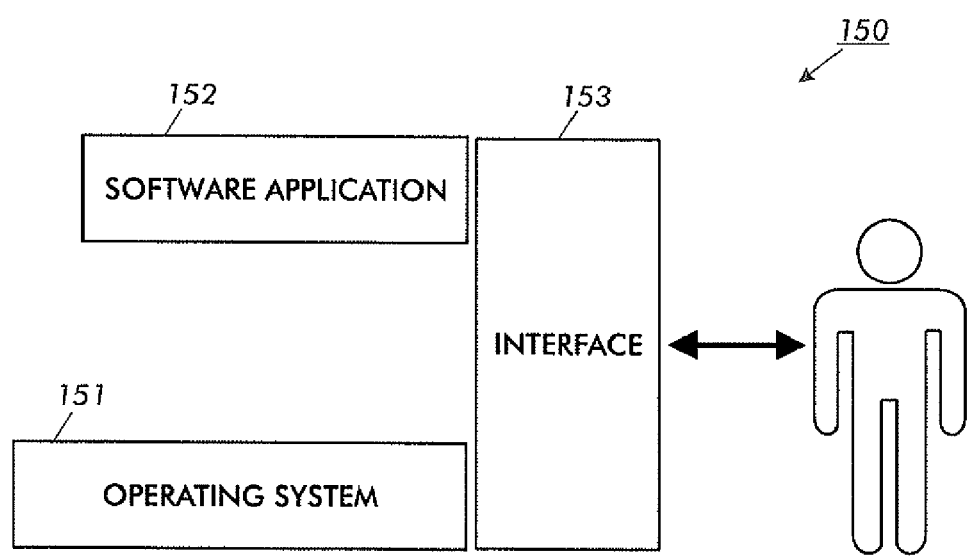
FIG. 2 illustrates a schematic view of a software system including an operating system, application software, and a user interface for carrying out the present invention.
Figure 3:
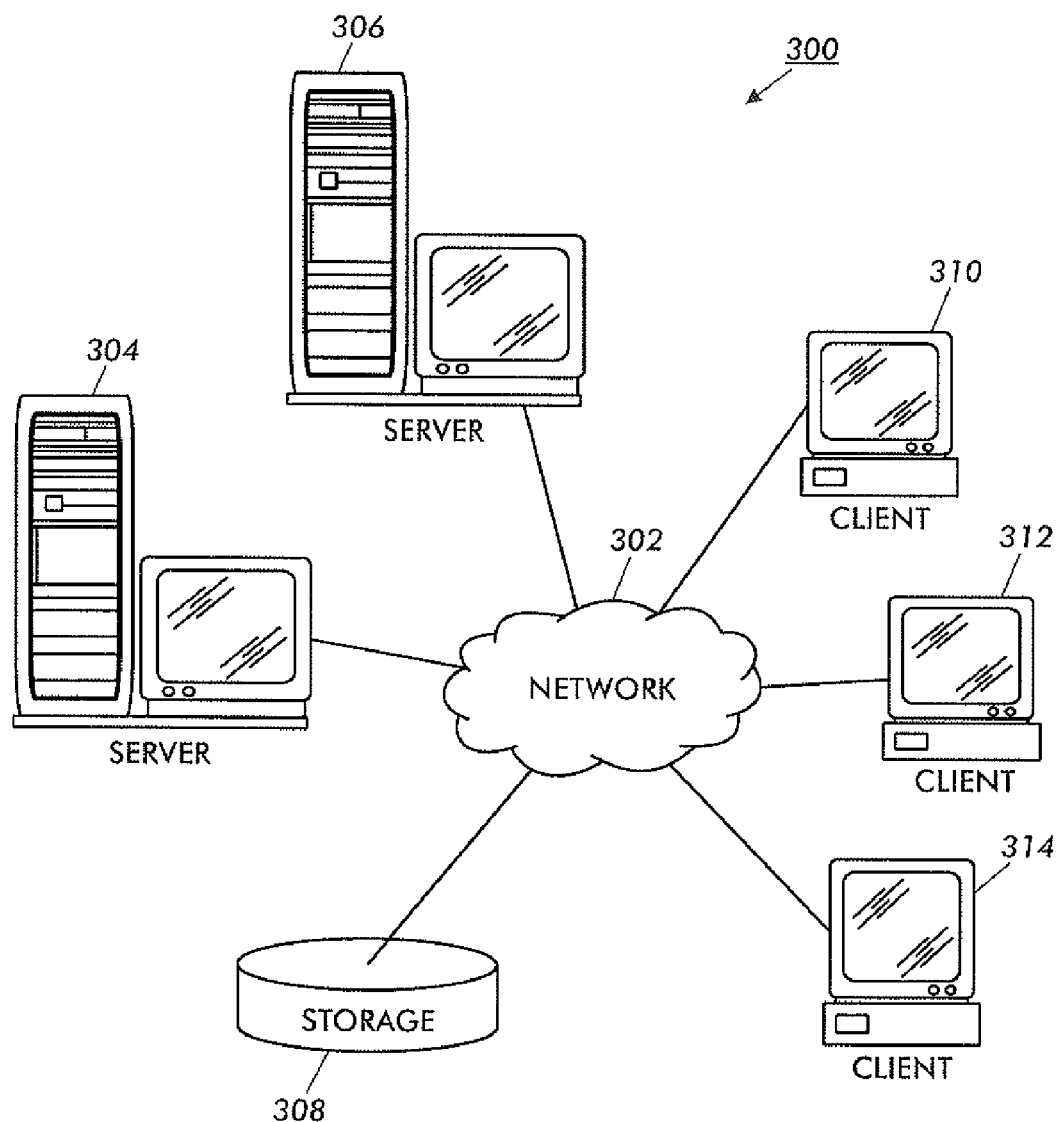
FIG. 3 depicts a graphical representation of a network of data processing devices in which aspects of the present invention may be implemented.

FIGS. 1-3 are provided as exemplary diagrams of data processing environments in which embodiments of the present invention may be adapted for use. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be adapted for use with a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108 (e.g., printer, scanner, copier, etc), may be included in association with the data-processing apparatus 100 as desired. As illustrated, the various components of the data-processing apparatus 100 communicate through a system bus 110 or similar architecture.

FIG. 2 illustrates a computer software system 150 for directing the operation of the data-processing apparatus 100. Software system 150, which is stored in system memory 102 and on disk memory 107, includes a kernel or operating system 151 and a shell or interface 153. One or more application programs, such as application software 405, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

An interface 153, which is preferably a graphical user interface (GUI), can also be utilized in the context of system 150. In one possible embodiment, operating system 151 and interface 153 can be implemented in the context of a "Windows" system. Application module 152, on the other hand, can include instructions, such as the various operations described herein with respect to the various components and modules described herein, such as, for example, the method 600 depicted in FIG. 6.

FIG. 3 depicts a graphical representation of a network of data processing devices in which aspects of the present invention may be implemented. Network data processing system 300 can be provided as a network of computers in which embodiments of the present invention may be implemented. Network data processing system 300 contains network 302, which is the medium used to provide communications links between various devices and computers connected together within network data processing apparatus 100. Network 102 may include connections, such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing apparatus 100 depicted in FIG. 1 can be, for example, a client such as client 310, 312, and/or 314. Alternatively, data-processing apparatus 100 can be implemented as a server, such as servers 304 and/or 306, depending upon design considerations.

In the depicted example, server 304 provides data, such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as for example, an intranet, a local area network (LAN), or a wide area network (WAN). FIG. 1 is intended as an example, and not as an architectural limitation for different embodiments of the present invention.

The following description is presented with respect to embodiments of the present invention, which can be embodied in the context of a data-processing system such as data-processing apparatus 100, computer software system 150 and data processing system 300 and network 302 depicted respectively FIGS. 1-3. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
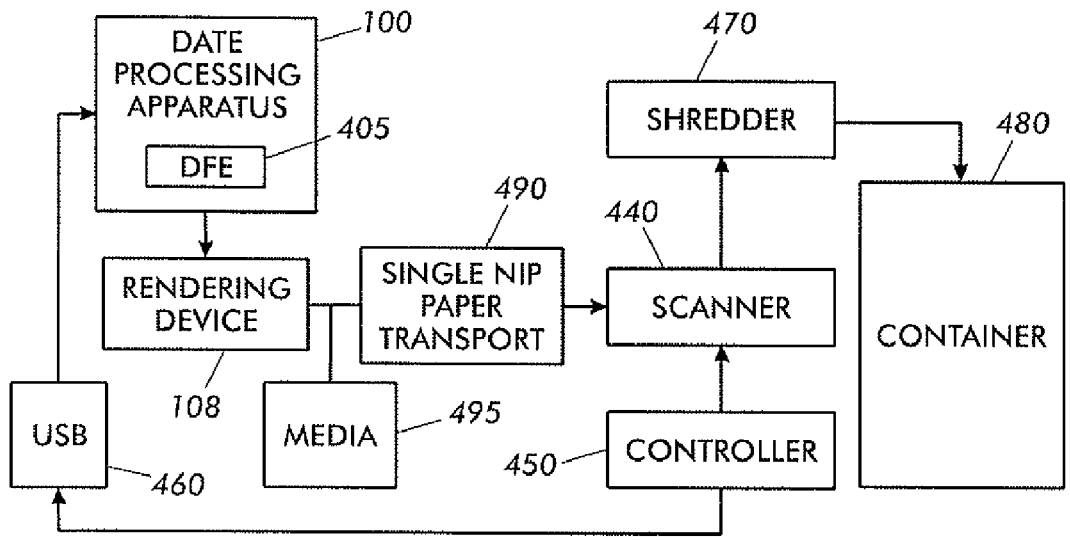
FIG. 4 illustrates a block diagram depicting main components of a scanning shredder, in accordance with a preferred embodiment.

FIG. 4 illustrates a block diagram depicting main components of a scanning shredder apparatus 400, in accordance with a preferred embodiment. The scanning shredder apparatus 400 can function in association with the a data processing apparatus 100 depicted in FIG. 1, and can include the use of a DFE 405 and the rendering device 108. The rendering device 108 may constitute a rendering device, such as, for example, an inkjet printer, a laser printer, a photo printer, and so forth. Rendering device 108 may also be implemented as an MFP (Multifunction Peripheral or Multi-Functional Peripheral) that incorporates additional functions such as facsimile transmission, scanning, copying, and so forth.

Media 495, such as, for example, a partially printed purge sheet of a confidential document, can be driven through a single nip paper transport mechanism 490 to a shredder 475 for shredding the printed media 495 utilizing a cutting mechanism. Note that media 495 can be printed media and/or other types of media such as disks or other storage devices requiring shredding. A scanner 440 scans the media 495 after shredding the printed media 495 and an image of the media 495 can be passed to the DFE 405 (memory) associated with the data-processing apparatus 100 through, for example, an electronic communications device such as a USB 460. Note that as utilized herein, the acronym "USB" generally refers "Universal Serial Bus," which is a standard for connecting peripherals to computers or other electronic devices. USB supports low and medium-bandwidth peripherals. There are at least two versions of the USB standard: USB 1.0 and USB 2.0. It can be appreciated, however, that although embodiments are discussed herein with respect to USB 460, other types of electronic communication devices may be utilized in place of USB 460.

The scanning shredder apparatus 400 further includes a controller 450 for providing functional control and communications to the DFE 405. Controller 450 can be, for example, a small electronic controller board. An image(s) of the media 495 can be saved in a DFE disk (not shown) or other type of memory for later reconciliation. The controller 450 generally controls the functioning of the scanning shredder 400 and communicates to the DFE 405 through USB 460. The scanned document provides a visual documentation of the media 495 on the DFE 405. The media 495 can be passed through the shredder 470 and the individual strands of the media 495 can be disassociated and can be dispersed into a container 480 in order to ensure destruction.

Figure 5:
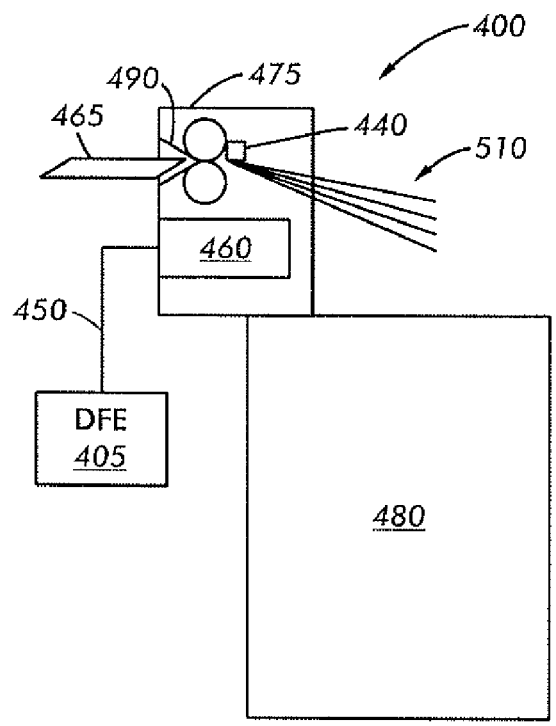
FIG. 5 illustrates a schematic diagram depicting main components of the scanning shredder, in accordance with a preferred embodiment.

FIG. 5 illustrates a schematic diagram depicting main components of a scanning shredder 400, in accordance with a preferred embodiment. Note that in FIGS. 1-6, identical or similar parts are generally indicated by identical reference numerals. A JDF job submitter upstream of the DFE 405 may actually be able to manage the job with respect to the printed media 465 and the job can be completed after the ultimate destination of each media 465 has been verified.

Figure 6:
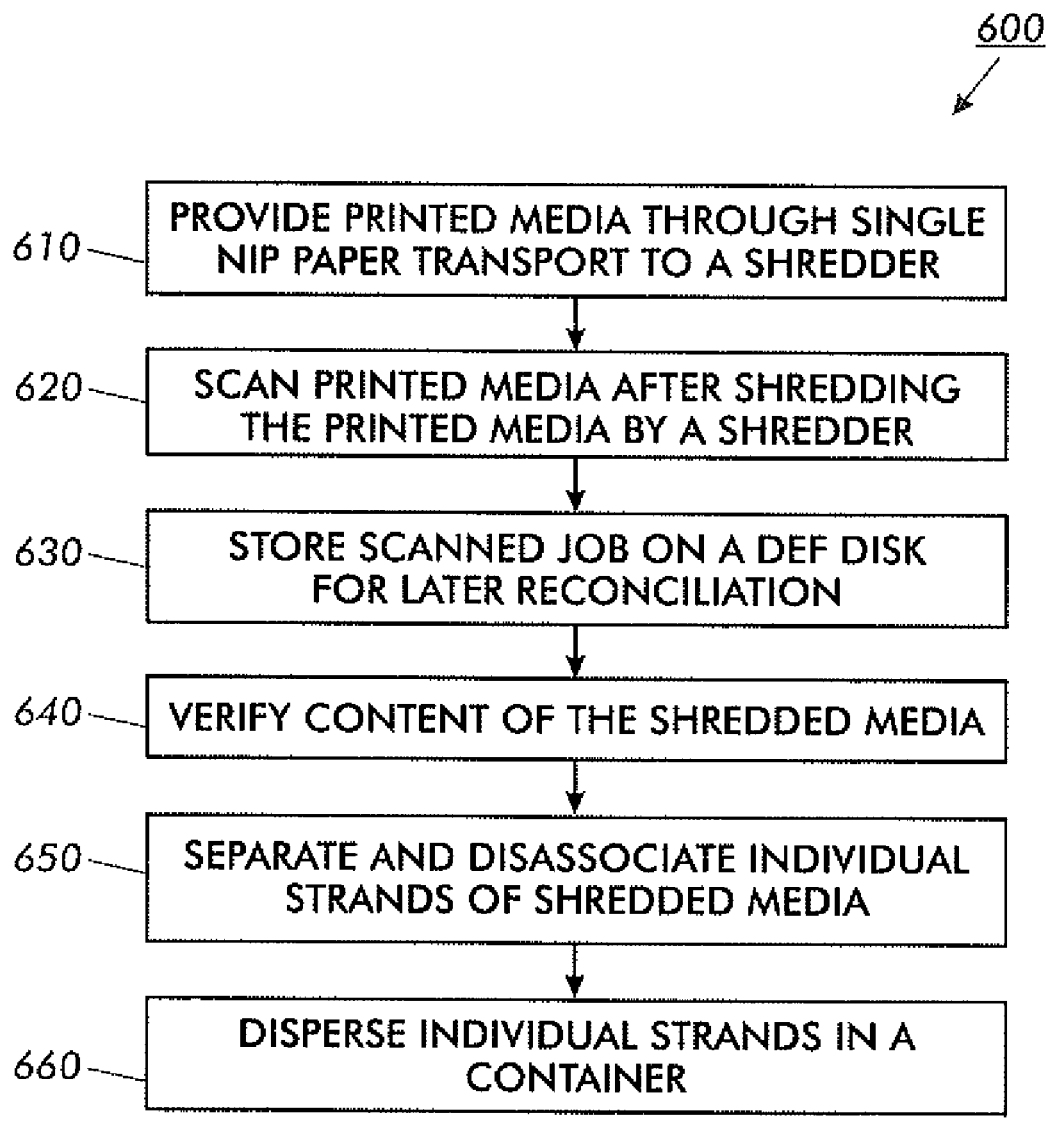
FIG. 6 illustrates a flow chart of operations illustrating logical operational steps of the scanning shredder apparatus, which can be implemented in accordance with a preferred embodiment.

FIG. 6 illustrates a flow chart of operations illustrating logical operational steps of a method 600 for operating the scanning shredder apparatus 400 in accordance with a preferred embodiment. Note that the method 600 can be implemented in the context of a computer-useable medium that contains a program product. The method 600 depicted in FIG. 6 can also be implemented in a computer-usable medium containing a program product.

Media 495 discussed earlier can be provided through a nip paper transport 490 to shredder 475, as depicted at block 610. The scanner 440 scans the media 495 and creates an image of the media 495 after shredding the printed media by the shredder 475, as depicted at block 620. Thereafter, the scanned image of the media 495 can be stored on a DFE disk (not shown) or another appropriate memory device, which can be utilized for later reconciliation, as depicted at block 630. The content of the media 495 can be verified using the scanned document, as illustrated next at block 640.

The user can control the rendering production through the GUI 153, which is associated with the DFE 405. Basic controls in the GUI 153 allow the user to select the jobs to process. The user can also store the scanned jobs of the media 495 for future rendering using the DFE 405. The individual strands of the shredded media 610 can be separated and disassociated for destruction after storing the images of the media 495 in a memory such as the described DFE disk, as depicted at block 650. The shredder 475 can thereafter destroys the media 495 into tiny pieces using a cutting mechanism and disperses the individual strands of the shredded media 610 into a container 480, as depicted at block 660. Varying levels of integration are possible such as scanned job storage on the DFE disk for later reconciliation or operating in a near-line capacity and accept job programming from the DFE 405. The workflow for the operation of the intelligent shredder apparatus 400 can necessarily follow the implemented level of integration. The scanning shredder apparatus 400 possess the ability to verify the content of the media 495 before shredding the output and provides convenient destruction of confidential documents Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 600 described herein can be deployed as process software in the context of a computer system or data-processing system as that depicted in FIGS. 1-3.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

Based on the foregoing, it can be appreciated that a method and system/mechanism are disclosed herein, which can be utilized to scan a document(s) being shredded just after it is fed through the blades, but before the slivers of paper begin to go their separate ways. Both options are disclosed herein (i.e., scan then shred, and/or shred then scan). Potential users of such a system/method include users of such devices such as Nuvera/Docutech/iGen/etc., and transactional printers that are extremely sensitive to job integrity and to the destruction of purged sheets. Using such large systems, for example, a JDF job submitter upstream of a DFE may actually be able to manage the job with respect to its sheets and not complete the job until the ultimate destination of each sheet has been verified (scanned by the shredder).

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method, comprising:
   providing a particular media through a blade associated with a shredder to produce a shredded media comprising individual strands of said particular media;
   scanning said shredded media via a scanner prior to separation of said individual strands;
   storing a scanned document of said shredded media in a memory which provides a visual documentation of a destruction of said particular media;
   verifying a content and destination of said shredded media utilizing a controller associated with said scanner for scanning thereof by said scanner; wherein:
   said scanner and said shredder comprises a transport drive to move said particular media passing said shredder for shredding by said shredder and through sam scanner for scanning by said scanner;
   said particular media comprises a plurality of partially printed purge sheets associated with a confidential document; and
   said scanner is integrated with said shredder, and wherein sam shredder is detachably mounted on a rendering device in order to shred said particular media output from said rendering device.

2. The method of claim 1 further comprising:
   separating and disassociating a plurality of individual strands of said shredded media for dispersement of said plurality of individual strands in a container, thereby ensuring that the content of said particular media is verified and stored electronically for later reconciliation.

3. The method of claim 1 further comprising associating a transport drive with said scanner and said shredder, wherein said transport drive moves said particular media passed said shredder for shredding by said shredder and through said scanner for scanning by said scanner.

4. The method of claim 1 wherein said memory comprises a DFE.

5. The method of claim 1 wherein said particular media comprises a plurality of partially printed purge sheets associated with a confidential document.

6. The method of claim 1 wherein said scanner is integrated with said shredder, and wherein said shredder is detachably mounted on a rendering device in order to shred said particular media output from said rendering device.

7. A method, comprising:
providing a particular media through a blade associated with a shredder to produce a shredded media comprising individual strands of said particular media;
scanning said shredded media via a scanner prior to separation of said individual strands wherein said scanner and said shredder comprise a transport drive to move said particular media passing said shredder for shredding by said shredder and through said scanner for scanning by said scanner;
storing a scanned document of said shredded media in a memory which provides a visual documentation of a destruction of said particular media;
verifying a content and destination of said shredded media utilizing a controller associated with said scanner for scanning thereof by said scanner; wherein:
said scanner and said shredder comprises a transport drive to move said particular media passing said shredder for shredding by said shredder and through sam scanner for scanning by said scanner;
said particular media comprises a plurality of partially printed purge sheets associated with a confidential document; and
said scanner is integrated with said shredder, and wherein sam shredder is detachably mounted on a rendering device in order to shred said particular media output from said rendering device.

8. The method of claim 7 further comprising separating and disassociating a plurality of individual strands of said shredded media for dispersement of said plurality of individual strands in a container, thereby ensuring that the content of said particular media is verified and stored electronically for later reconciliation.

9. The method of claim 8 wherein said container receives and maintains said shredded media, and wherein said memory comprises a DFE.

10. The method of claim 7 wherein said particular media comprises a plurality of partially printed purge sheets associated with a confidential document.

11. The method of claim 10 wherein said container receives and maintains said shredded media.

12. The method of claim 7 wherein said scanner is integrated with said shredder, and wherein said shredder is detachably mounted on a rendering device in order to shred said particular media output from said rendering device.

13. An apparatus, comprising:
a particular media through a blade associated with a shredder to produce a shredded media comprising individual strands of said particular media;
a scanner for scanning said shredded media prior to separation of said individual strands;
a memory for storing a scanned document of said shredded media in order to provide a visual documentation of a destruction of said particular media; and
a controller associated with said scanner, wherein a content and destination of said shredded media is verifiable utilizing said controller associated with said scanner for scanning thereof by said scanner; wherein:
said scanner and said shredder comprises a transport drive to move said particular media passing said shredder for shredding by said shredder and through sam scanner for scanning by said scanner;
said particular media comprises a plurality of partially printed purge sheets associated with a confidential document; and
said scanner is integrated with said shredder, and wherein sam shredder is detachably mounted on a rendering device in order to shred said particular media output from said rendering device.

14. The apparatus of claim 13 further comprising:
a container for separating and disassociating a plurality of individual strands of said shredded media for dispersement of said plurality of individual strands in said container, thereby ensuring that the content of said particular media is verified and stored electronically for later reconciliation.

15. The apparatus of claim 13 further comprising a transport drive associated with said scanner and said shredder, wherein said transport drive moves said particular media passed said shredder for shredding by said shredder and through said scanner for scanning by said scanner.

16. The apparatus of claim 13 wherein said container receives and maintains said shredded media.

17. The apparatus of claim 13 wherein said memory comprises a DFE.

18. The apparatus of claim 13 wherein said particular media comprises a plurality of partially printed purge sheets associated with a confidential document.

19. The apparatus of claim 13 wherein said scanner is integrated with said shredder, and wherein said shredder is detachably mounted on a rendering device in order to shred said particular media output from said rendering device.

* * * * *